US007831209B2

(12) United States Patent
Yasuda et al.

(10) Patent No.: US 7,831,209 B2
(45) Date of Patent: Nov. 9, 2010

(54) DATA TRANSMITTER-RECEIVER, BIDIRECTIONAL DATA TRANSMITTING SYSTEM, AND DATA TRANSMITTING-RECEIVING METHOD

(75) Inventors: Yasuyo Yasuda, Fujisawa (JP); Nobuhiko Naka, Yokohama (JP); Tomoyuki Ohya, Yokohama (JP); Toshio Miki, Yokohama (JP)

(73) Assignee: NTT DoCoMo, Inc., Chiyoda-ku (JP)

(*) Notice: Subject to any disclaimer, the term of this patent is extended or adjusted under 35 U.S.C. 154(b) by 1279 days.

(21) Appl. No.: 11/372,056

(22) Filed: Mar. 10, 2006

(65) Prior Publication Data

US 2006/0236159 A1 Oct. 19, 2006

(30) Foreign Application Priority Data

Mar. 11, 2005 (JP) ............................ 2005-068910

(51) Int. Cl.
*H04B 1/38* (2006.01)

(52) U.S. Cl. .................. 455/73; 455/426.1; 455/456.1; 455/456.6

(58) Field of Classification Search .................. 455/73, 455/426.1, 456.1, 456.6, 457
See application file for complete search history.

(56) References Cited

U.S. PATENT DOCUMENTS

| | | | | |
|---|---|---|---|---|
| 6,175,872 | B1 | 1/2001 | Neumann et al. | |
| 6,259,795 | B1 | 7/2001 | McGrath | |
| 6,683,567 | B2 * | 1/2004 | De Champlain et al. | 342/385 |
| 2003/0117318 | A1 | 6/2003 | Champlain et al. | |
| 2004/0001143 | A1 | 1/2004 | Beal et al. | |

FOREIGN PATENT DOCUMENTS

| | | | |
|---|---|---|---|
| JP | 09-284627 | * | 10/1997 |
| JP | 2003-289463 | * | 10/2003 |
| JP | 2004-294283 | | 10/2004 |

OTHER PUBLICATIONS

Frederic Wightman, et al., "Reassessment of the role of head movements in human sound localization", J. Acoust. Soc. A., vol. 95, No. 5, Pt. 2, May 1994, pp. 3003-3004.
European Search Report.

* cited by examiner

*Primary Examiner*—Tuan H Nguyen
(74) *Attorney, Agent, or Firm*—Crowell & Moring LLP

(57) ABSTRACT

To provide a data transmitter-receiver bidirectional transmitting system, and data transmitting-receiving method capable of reducing influences of a transmission delay when performing bidirectional communication with an other-communication-party apparatus in an environment in which various states are dynamically changed depending on time.

A data obtaining portion 11 of a terminal 10 obtains positional directional information D(Tn) and a time information obtaining portion 12 obtains time information Tn. The terminal 10 stores D(Tn) and Tn in a memory portion 13 and a transmitting portion 15 transmits D(Tn) and Tn to a server 20. A data generating portion 21 of the server 20 generates stereophonic data S(Tn) by using D(Tn), a time information copying portion 22 copies Tn, a transmitting portion 24 transmits S(Tn) and Tn to the terminal 10. A data obtaining portion 11 of the terminal 10 obtains positional directional information D(Tm), the time information obtaining portion 12 obtains time information Tm, and a correcting portion 14 corrects the difference between D(Tm) and D(Tn) to generate S'(m).

8 Claims, 9 Drawing Sheets

DATA TRANSMITTER-RECEIVER, BIDIRECTIONAL DATA TRANSMITTING SYSTEM, AND DATA TRANSMITTING-RECEIVING METHOD

BACKGROUND OF THE INVENTION

1. Field of the Invention

The present invention relates to a data transmitter-receiver for performing bidirectional data transmission in a communication environment in which various states are dynamically changed and a transmission path having a delay, bidirectional data transmitting system, and data transmitting-receiving method.

2. Description of the Related Art

When performing bidirectional communication in a transmission path having a delay, there may be an inconsistency between the state of a receiver when a transmitting-side apparatus generates transmission data to be transmitted to a receiving-side apparatus and the state of a receiver when the receiving-side apparatus receives transmission data. Therefore, a mechanism for compensating this inconsistency is necessary. When the transmitting-side apparatus and receiving-side apparatus perform execution processing in harmony because of load dispersion or the like, it is necessary to grasp mutual states each other by, for example, synchronizing them.

As an example, a case of stereophonic transmission is described below.

A system for realizing stereophony by a two-channel stereophonic system is studied in recent years and a technique for using head transfer functions which are transfer function from sound sources to ears of a listener is known. When input sound sources are filtered by HRTFs digitally and the filtered signals are played back through two-channel loudspeakers or headphones, the listener perceives stereophonic sound effect. This is a technique suited for reproducing stereophonic sound in a cellular terminal compared to a multichannel reproducing system for reproducing surround acoustic space by arranging many speakers around. However, the head transfer function changes depending on the relative position between a listener and a sound source and direction of the listener. To reproduce a dynamic sound field in which self or other party for speaking, that is, the sound source or listener optionally moves, it is necessary to follow the position of the sound source and the listener and direction of the head. Therefore, a method for detecting position and rotation of the head and sequentially updating head transfer function filters is used (for example, refer to "Reassessment of the role of head movements in human sound localization", F. Wightman, et al., J. Acoust. Soc. Am., 95(5), pp. 3003-3004; hereinafter referred to as Non-patent Document 1). By introducing the following function, the improvement of the accuracy of directional perception is expected.

When reproducing stereophony by the above technique in mobile communication, there is a terminal, as shown in FIG. 12, for receiving a plurality of sound-source data and performing stereophonic processing. However, in the case of this terminal-side processing system, large bandwidth is also required for transmitting all acoustic data relative to sound sources assigned in a stereophonic space. When it applies to a terminal having restrictions on processing power and transmission bandwidth such as a cellular phone, it is preferable to minimize them.

As another method, it is considered to use a stereophonic transmitting system comprising a server for receiving a plurality of sound sources data and transmitting the sound data to which stereophonic processing has been applied to a terminal as shown in FIG. 13 and a terminal for reproducing the received stereophonic data. In the case of this server-side processing system, problems of the above-described terminal throughput and transmission data quantity are settled. However, the position and direction of the listener's head must be transmitted to a server in order to perform stereophonic processing according to the movement of the listener. This causes another problem when a large transmission delay between the server and terminal exists. That is a mismatch between the received stereophonic data and actual position and direction of the head (head tracking delay).

Moreover, as still another method, it is considered to use a stereophonic transmitting system comprising a server for receiving a plurality of sound-source data and transmitting the data to which stereophonic processing has been applied to a terminal and a terminal for correcting and reproducing received stereophonic data received in accordance with the latest positional and directional information as shown in FIG. 14 (for example, refer to U.S. Pat. No. 6,259,795; hereinafter referred to as Patent Document 1). In the case of this technique, as disclosed in Patent Document 1, when a sound field is static, it is possible to generate a stereophonic field with a simple operation and a reduced-tracking delay at the terminal side if the server sends stereophonic-processed sound to the terminal and compensation of the acoustic image mismatch due to the small movement of the listener's head.

SUMMARY OF THE INVENTION

However, in the case of the technique disclosed in Patent Document 1, compensation cannot be made unless sound sources and the position and direction of the listener are already known at the terminal side when the server performs stereophonic processing. Therefore, there is a problem that it is difficult to apply this technique to a dynamic stereophonic field in which positions of a listener and sound sources (other communication party) and the direction of the head are changed on occasion as in mobile communications.

Moreover, when a transmitting-side apparatus and receiving-side apparatus perform bidirectional data transmission through a transmission path having a delay, a problem occurs that it is difficult to keep internal states of the transmitting-side apparatus and receiving-side apparatus same due to the influence of a transmission delay.

The above problems may occur on interactive communication (bidirectional data transmission) when using a transmission path having a delay and where various states such as the position and direction of a listener, position of another communication apparatus, and internal states of transmitting-side apparatus and receiving-side apparatus are dynamically changed.

The present invention is made in view of the above problems and its objective is to provide a data transmitter-receiver, bidirectional data transmitting system, and data transmitting-receiving method capable of reducing influences of a transmission delay when performing bidirectional communication with another communication apparatus with an environment where various states are dynamically changed.

To solve the above problems, an embodiment of the invention provides a data transmitter-receiver for performing bidirectional data communication with another communication apparatus which comprises data obtaining means for obtaining change data to be changed depending on time, time information obtaining means for obtaining time information showing the time when the change data obtained by the data obtaining means is generated, receiving means for receiving transmission data and predetermined time information showing that the transmission data is the data at predetermined time, which are transmitted from the another communication apparatus, and correcting means for correcting a delay introduced by the data transmission with the another communication apparatus in accordance with the change data obtained by the data obtaining means, the time information obtained by the time information obtaining means, predetermined time information received by the receiving means, and transmission data.

According to the above configuration, because data transmitter-receiver can obtain the time information showing the time when change data and transmission data are generated and correct a delay introduced due to data transmission with the another communication apparatus in accordance with these change data, transmission data and time information, it is possible to reduce influences of the transmission delay even in the environment in which various states are dynamically changed depending on time.

In an embodiment, the data transmitter-receiver further comprises transmitting means for transmitting the change data at the predetermined time obtained by the data obtaining means and the predetermined time information showing the predetermined time obtained by the time information obtaining means to the another communication apparatus and the correcting means corrects the tracking delay of the transmission data at the predetermined time received by the receiving means in accordance with the difference between the change data at the predetermined time transmitted by the transmitting means and the latest change data obtained by the data obtaining means.

According to the above configuration, data transmitter-receiver can correct a tracking delay of the transmission data at predetermined time in accordance with the difference between the change data at predetermined time and the latest change data even when performing bidirectional communication with another communication apparatus in an environment in which various states are dynamically changed depending on time and reduce influences of a tracking delay.

In an embodiment the data transmitter-receiver further comprises storing means for relating the change data obtained by the data obtaining means with the time information showing the time obtained by the time information obtaining means and storing the information, wherein the correcting means corrects the transmission data at the predetermined time received by the receiving means to the transmission data corresponding to the latest time information in accordance with the difference between the latest change data corresponding to the latest time information and the change data corresponding to the predetermined time, which are stored in the storing means.

According to the above configuration, by storing change data and time information in the storing means after relating the change data with the time information, the data transmitter-receiver can easily correct the transmission data at predetermined time to the transmission data corresponding to the latest time information in accordance with the difference between the latest change data corresponding to the latest time information and the change data corresponding to predetermined time information. Therefore, even when bidirectional communication is performed with another communication apparatus in an environment in which various states are dynamically changed, it is possible to reduce influences of a tracking delay.

In an embodiment, the data obtaining means obtains change data synchronously with the obtaining timing of the time information by the time information obtaining means.

According to the above configuration, because the time information obtaining timing synchronizes with the change data obtaining timing, it is possible to use a time stamp to be added to the header of a communication packet as time information by generating the communication packet including change data in accordance with the timing and restrain transmission data quantity.

In an embodiment, the time information obtaining means obtains time information synchronously with the encoding period of encoded data to be transmitted to the another communication apparatus.

According to the above configuration, it is possible to obtain time information by using the encoding period of encoded data when transmitting the encoded data to another communication apparatus. Therefore, a data transmitter-receiver does not have to transmit time information to the another communication apparatus and it is possible to restrain transmission data quantity.

In an embodiment, the invention provides a data transmitter-receiver for performing bidirectional data transmission with another communication apparatus, which comprises receiving means for receiving change data to be changed in accordance with time and time information showing the time when the change data is generated from the another communication apparatus, data generating means for generating transmission data to be transmitted to the another communication apparatus in accordance with the change data received by the receiving means, time information copying means for copying the time information received by the receiving means, and transmitting means for transmitting the transmission data generated by the data generating means and time information copied by the time information copying means to the another communication apparatus.

According to the above configuration, because the data transmitter-receiver generates the transmission data at the time shown by the time information received by the receiving means and transmits the time information to the another communication apparatus together with the generated transmission data, the another communication apparatus can grasp when the transmission data is generated and it is possible to correct a delay introduced through data transmission.

In an embodiment, the receiving means receives encoded data instead of the time information and the time information copying means copies the time information by using the encoding period of the encoded data received by the receiving means.

According to the above configuration, the data transmitter-receiver can copy the time information by using the encoding period of the encoded data without receiving the time information from the another communication apparatus. Therefore, it decreases data transmission bandwidth.

In an embodiment, the transmission data is medium data and the change data is positional directional information showing at least one of the position and direction of a receiver for receiving the medium data.

According to the above configuration, the data transmitter-receiver can reduce influences of a tracking delay by obtaining the time when the positional directional information and medium data are generated and correcting the tracking delay of the medium data and it is possible to realize high-quality medium data transmission.

In an embodiment, the invention provides a bidirectional data communicating system comprising a first data transmitter-receiver and a second transmitter-receiver, wherein the first data transmitter-receiver includes data obtaining means for obtaining change data to be changed in accordance with time, time information obtaining means for obtaining time information showing the time when the change data obtained by the data obtaining means is generated, transmitting means for transmitting the change data obtained by the data obtaining means and the time information obtained by the time information obtaining means to the second data transmitter-receiver, receiving means for receiving the transmission data and predetermined time information showing that the transmission data is the data at predetermined time, which are transmitted from the second data transmitter-receiver, and correcting means for correcting a delay introduced through data transmission with the second data transmitter-receiver in accordance with the change data obtained by the data obtaining means, the time information obtained by the time information obtaining means, predetermined time information received by the receiving means, and transmission data, and the second data transmitter-receiver includes receiving means for receiving the change data and the predetermined time information showing the predetermined time when the change data is generated from the first data transmitter-receiver, data generating means for generating the transmission data in accordance with the change data received by the receiving means, time information copying means for copying the predetermined time information received by the receiving means, and transmitting means for transmitting the transmission data generated by the data generating means and predetermined time information copied by the time information copying means to the first data transmitter-receiver.

According to the above configuration, the second transmitter-receiver constituting the bidirectional data transmitting system transmits the time information showing the time when the transmission data is generated together with the transmission data to the first transmitter-receiver and the first transmitter-receiver grasps when the transmission data and change data are generated and thereby, it is possible to correct a delay introduced due to data transmission with the second data transmitter-receiver even in an environment in which various states are dynamically changed depending on time and reduce influences of a transmission delay. Moreover, because processing is performed by dispersing the processing to the first data transmitter-receiver and second transmitter-receiver, it is possible to reduce a processing load even if a data transmitter-receiver is a terminal unit poor in resources. Thus, it is possible to reduce influences of a transmission delay while maintaining reasonable load and transmission bandwidth of each data transmitter-receiver.

In an embodiment, the invention provides a data transmitting-receiving method in which a terminal unit receives medium data transmitted by a server, which comprises a first information obtaining step for the terminal unit to obtain first positional directional information showing at least one of the position and direction of a receiver and the first time information showing the time when the first positional directional information is generated, a storing step for the terminal unit to relate the first positional directional information with the first time information and storing the information in a memory, a first information transmitting step for the terminal unit to transmit the first positional directional information and the first time information to the server, a data processing step for the server to process the medium data to be transmitted to the terminal unit in accordance with the first positional directional information transmitted in the first information transmitting step, a time information copying step for the server to copy the first time information transmitted in the first information transmitting step, medium data transmitting step for the server to transmit the medium data processed in the data processing step and the first time information copied in the time information copying step to the terminal unit, a first positional directional information obtaining step for the terminal unit to obtain the first positional directional information corresponding to the first time information transmitted in the medium data transmitting step from the memory, a second information obtaining step for the terminal unit to obtain second positional directional information and second time information showing the time when the second positional directional information is generated, and a correcting step for the terminal unit to correct the medium data transmitted in the medium data transmitting step to medium data corresponding to the second time information in accordance with the second positional directional information, the second time information, the first positional directional information, and the first time information.

According to the above method, it is possible for the terminal unit to communicate the first positional directional information and first time information to the server, the server to generate the medium data corresponding to the first time information, and the terminal unit to correct the medium data corresponding to the first time information to medium data corresponding to the second time information in accordance with the first positional directional information, first time information, and newly obtained second positional directional information and second time information. Therefore, even if the positional directional information is fed back from the terminal unit to the server, it is possible to decrease tracking delays and reproduce medium data. Moreover, because processing is performed by dispersing the processing to a server and a terminal unit, it is possible to reduce a processing load. It is also possible to reduce influences of a transmission delay in a transmission path and improve the communication quality even in a dynamic environment in which the direction and position of a receiver are changed dynamically.

According to the present invention, it is possible for a data transmitter-receiver to obtain time information showing the time when change data and transmission data are generated and corrects a delay introduced due to data transmission with another communication apparatus in accordance with the change data, transmission data and time information. Therefore, it is possible to reduce influences of a transmission delay even in an environment in which various states are dynamically changed depending on time.

DETAILED DESCRIPTION OF THE PREFERRED EMBODIMENTS

Figure 1:
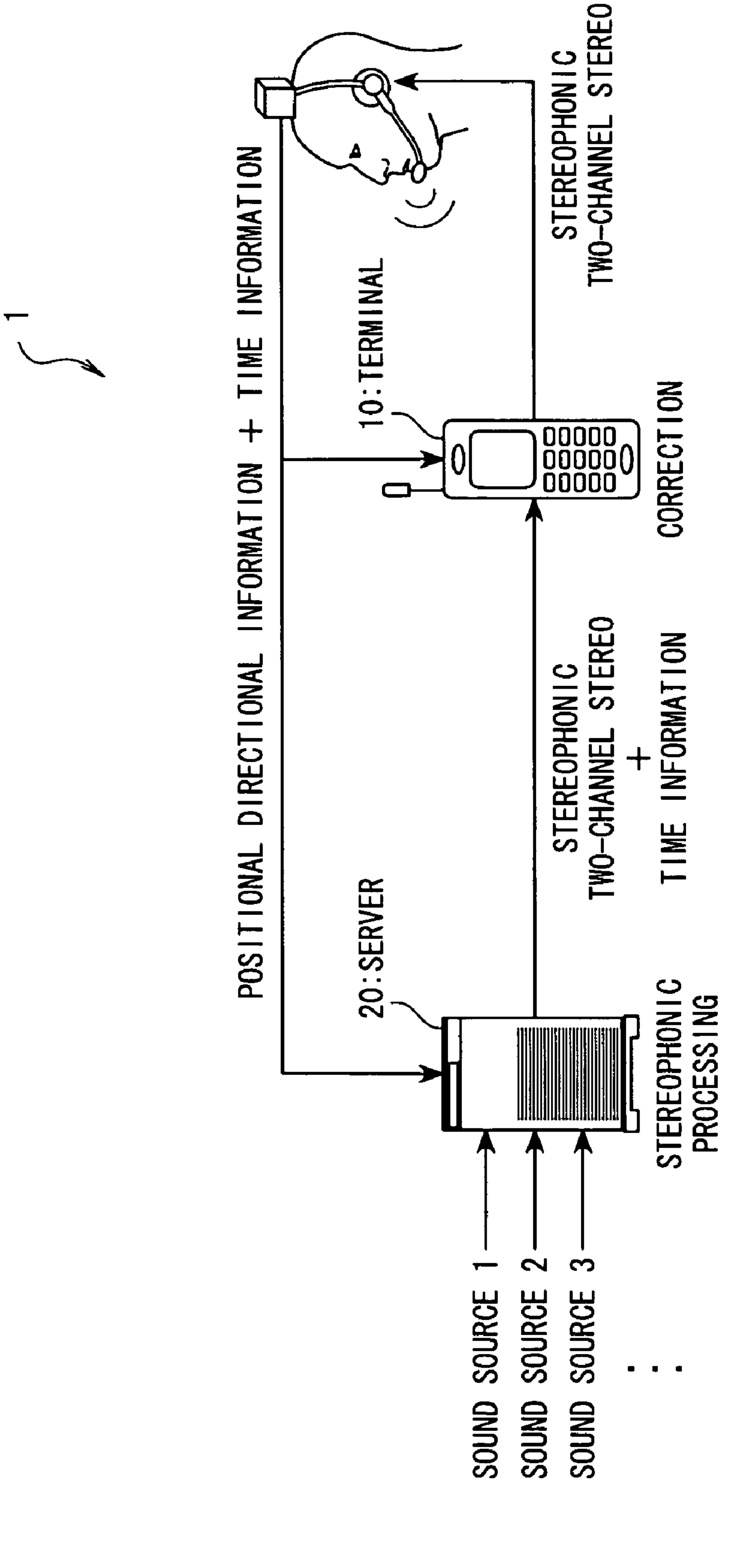
FIG. 1 is an illustration showing a schematic configuration of a stereophonic transmitting system of first embodiment of the present invention.

Now, embodiments of the present invention are described below by referring to the accompanying drawings. In the drawings to be referred to in the following description, a portion same as that in other drawings is provided with the same symbol.

First Embodiment

First, first embodiment of the present invention is described below. In the case of the first embodiment, a data transmitter-receiver of the present invention is applied to a terminal 10 and a server 20 constituting a stereophonic transmitting system 1.

FIG. 1 is an illustration showing a schematic configuration of the stereophonic transmitting system of the first embodiment of the present invention. As shown in FIG. 1, the stereophonic transmitting system 1 includes the terminal 10 and server 20. The terminal 10 and server 20 include the hardware such as a not-illustrated CPU (Central Processing Unit), memory, and communication interface. Software such as data and programs is stored in the memory. Among the programs, a program for transmitting and receiving time information to and from another communication apparatus and performing the processing using the time information is included. The functional configuration described below is realized in the terminal 10 and server 20 by the hardware and software of the terminal 10 and server 20.

<Functional Configuration of Terminal>

Figure 2:
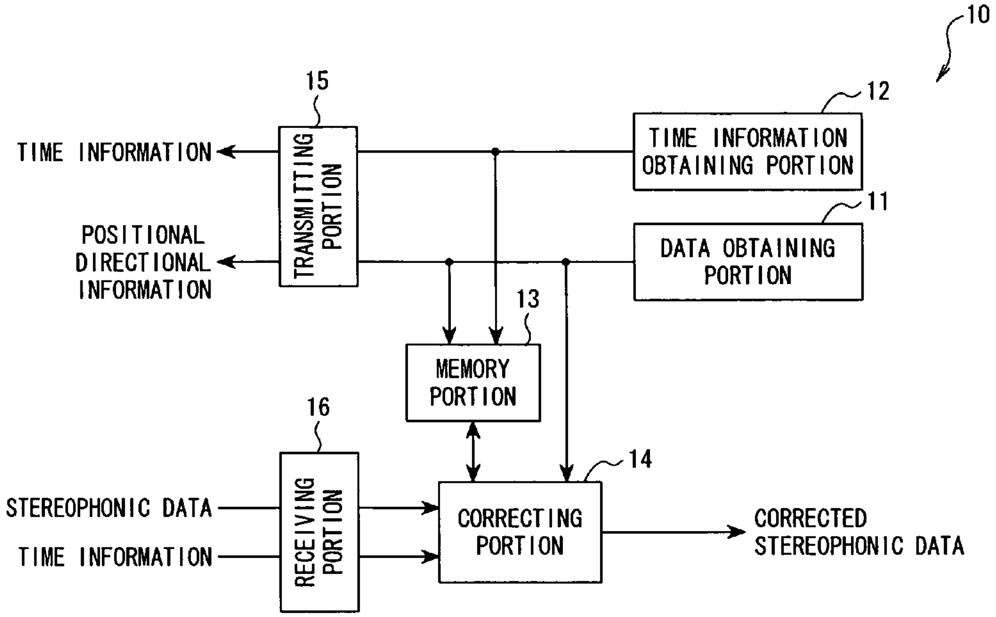
FIG. 2 is a block diagram showing a functional configuration of a terminal of the first embodiment.

FIG. 2 is a block diagram showing a functional configuration of the terminal 10.

A data obtaining portion 11 shown in FIG. 2 obtains positional directional information on the position and directions of the head and body of a listener as change data varied depending on time. It is allowed that the data obtaining portion 11 obtains positional directional information from a sensor such as gyrosensor or magnetic sensor or obtains the positional directional information from a GPS (Global Positioning System) or compass. Moreover, when reproducing a virtual audio space by a stereophonic signal, it is allowed that the data obtaining portion 11 obtains a position or direction optionally input to the terminal 10 when a listener uses a joystick or the like.

A time information obtaining portion 12 obtains time information showing the time when the positional directional information obtained by the data obtaining portion 11 is generated. The time information may be the time information of an internal clock or the time information of the GPS when the data obtaining portion 11 receives receiving positional directional information from a GPS.

A memory portion 13 comprises a memory such as a non-volatile memory. The memory portion 13 stores the positional directional information obtained by the data obtaining portion 11 and the time information obtained by the time information obtaining portion 12.

A transmitting portion 15 transmits the positional directional information obtained by the data obtaining portion 11 and the time information obtained by the time information obtaining portion 12 to the server 20.

A receiving portion 16 receives stereophonic data as the transmission data from the server 20. Moreover, the receiving portion 16 receives stereophonic data and the time information showing the time when the stereophonic data is generated.

A correcting portion 14 corrects a tracking delay introduced due to data transmission with the server 20 in accordance with the positional directional information obtained by the data obtaining portion 11, time information obtained by the time information obtaining portion 12, time information and stereophonic data received by the receiving portion 16.

Specifically, the correcting portion 14 first reads positional directional information corresponding to the time information received by the receiving portion 16 from the memory portion 13. Then, the correcting portion 14 obtains the latest positional directional information from the data obtaining portion 11. The correcting portion 14 corrects stereophonic data in accordance with the difference between the read positional directional information and the latest positional directional information. It is also allowed that the correcting portion 14 receives the latest positional directional information from the data obtaining portion 11 or through the memory portion 13. Moreover, as a correction method of stereophonic data, it is allowed to calculate the difference between two positional directional informations, obtain a correction transfer function corresponding to the difference, and process the received stereophonic data by the correction transfer function. It is also allowed to use the technique disclosed in U.S. Pat. No. 6,532,291 by using the difference between two positional directional informations. In the case of distance correction, it is allowed to use a filter simulating distance attenuation or a technique for more simply changing sound volume. When the transmission data transmitted from the server 20 to the terminal 10 is image data, it is allowed that the server 20 transmits an image having an angle of visibility wider than the range to be displayed to the terminal 10 and the correcting portion 14 of the terminal 10 shifts the range of an image to be displayed in accordance with head rotation.

<Functional Configuration of Server>

Figure 3:
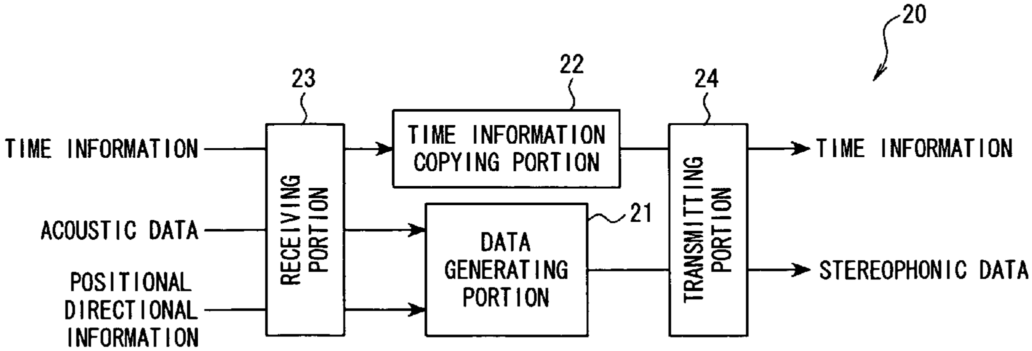
FIG. 3 is a block diagram showing a functional configuration of a server of the first embodiment.

The functional configuration of the server 20 is described. FIG. 3 is a block diagram showing the functional configuration of the server 20.

The receiving portion 23 of the server 20 receives time information and positional directional information from one or more terminals 10.

A data generating portion 21 applies stereophonic processing to received acoustic data based on the positional directional information received by the receiving portion 23.

A time information copying portion 22 copies the time information received from the terminal 10 by the receiving portion 23, which shows the time information relative to the positional directional information used for generating the stereophonic data at the data generating portion 21.

A transmitting portion 24 transmits the stereophonic data generated by the data generating portion 21 and the time information copied by the time information copying portion 22 to the terminal 10.

<Operations>

An example of operations of the terminal 10 and server 20 constituting the stereophonic transmitting system 1 are described below.

The data obtaining portion 11 of the terminal 10 obtains the positional directional information D of a listener (step S101) and at the same time, the time information obtaining portion 12 obtains the time information Tn showing the time when the positional directional information D is generated (step S102).

The transmitting portion 15 of the terminal 10 transmits the positional directional information D(Tn) at the time of the time information Tn and time information Tn to the server 20 and the terminal 10 also writes the positional directional information D(Tn) and time information Tn in the memory portion 13 (step S103).

The receiving portion 23 of the server 20 receives the time information Tn and positional directional information D(Tn) from the terminal 10 (step S201). The data generating portion 21 applies the stereophonic processing to acoustic data, in accordance with positional directional information D(Tn), by, for example, using a head transfer function corresponding to the relative relation between positional directional information D(Tn) and acoustic data to generate stereophonic data S(Tn) in a sound field at the time of time information Tn (step S202). The time information copying portion 22 copies the time information Tn in order to show that the generated stereophonic data S(Tn) is a sound field at the time of Tn (step S203). The transmitting portion 24 transmits the stereophonic data S(Tn) and time information Tn to the terminal 10 (step S204).

The receiving portion 16 of the terminal 10 receives the time information Tn and stereophonic data S(Tn) from the server 20 (step S104). The correcting portion 14 reads the positional directional information D(Tn) at the time of the time information Tn from the memory portion 13 (step S105).

The correcting portion 14 receives the latest positional directional information D(Tm) from the data obtaining portion 11 (step S106), corrects the stereophonic data S(Tn) in accordance with the difference between the positional directional information D(Tn) and the latest positional directional information D(Tm) (step S107), and generates the stereophonic data S'(Tm) to be actually reproduced by the terminal 10 (step S108).

Stereophonic data and auxiliary information showing the time of positional directional information used for generating the stereophonic data are transmitted to the terminal 10 from the server 20 for performing stereophonic processing and the terminal 10 corrects the difference between the latest position and direction of a head by using the auxiliary information. It is possible to compensate the mismatch of acoustic image due to a tracking delay.

Figure 4:
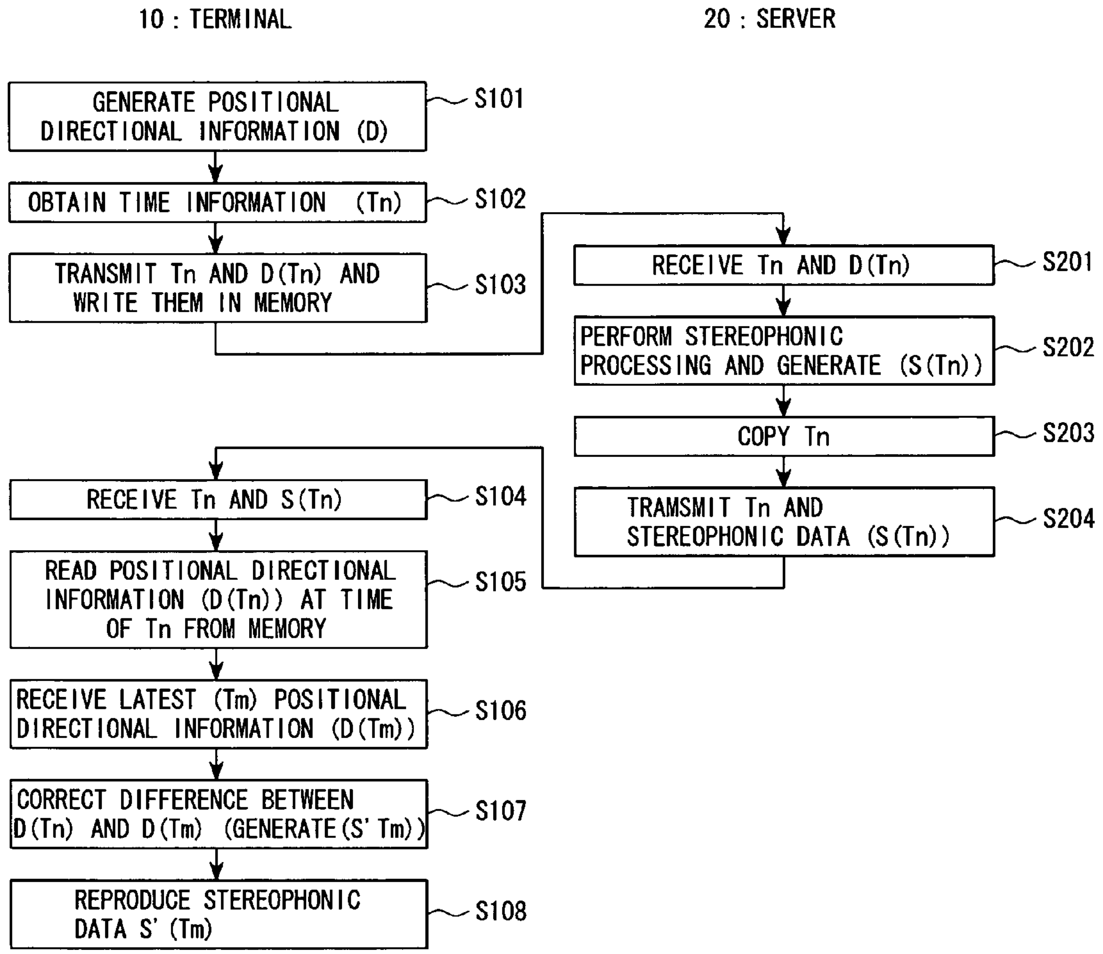
FIG. 4 is a flowchart for explaining an example operations of a terminal and a server of the first embodiment.
Figure 5:
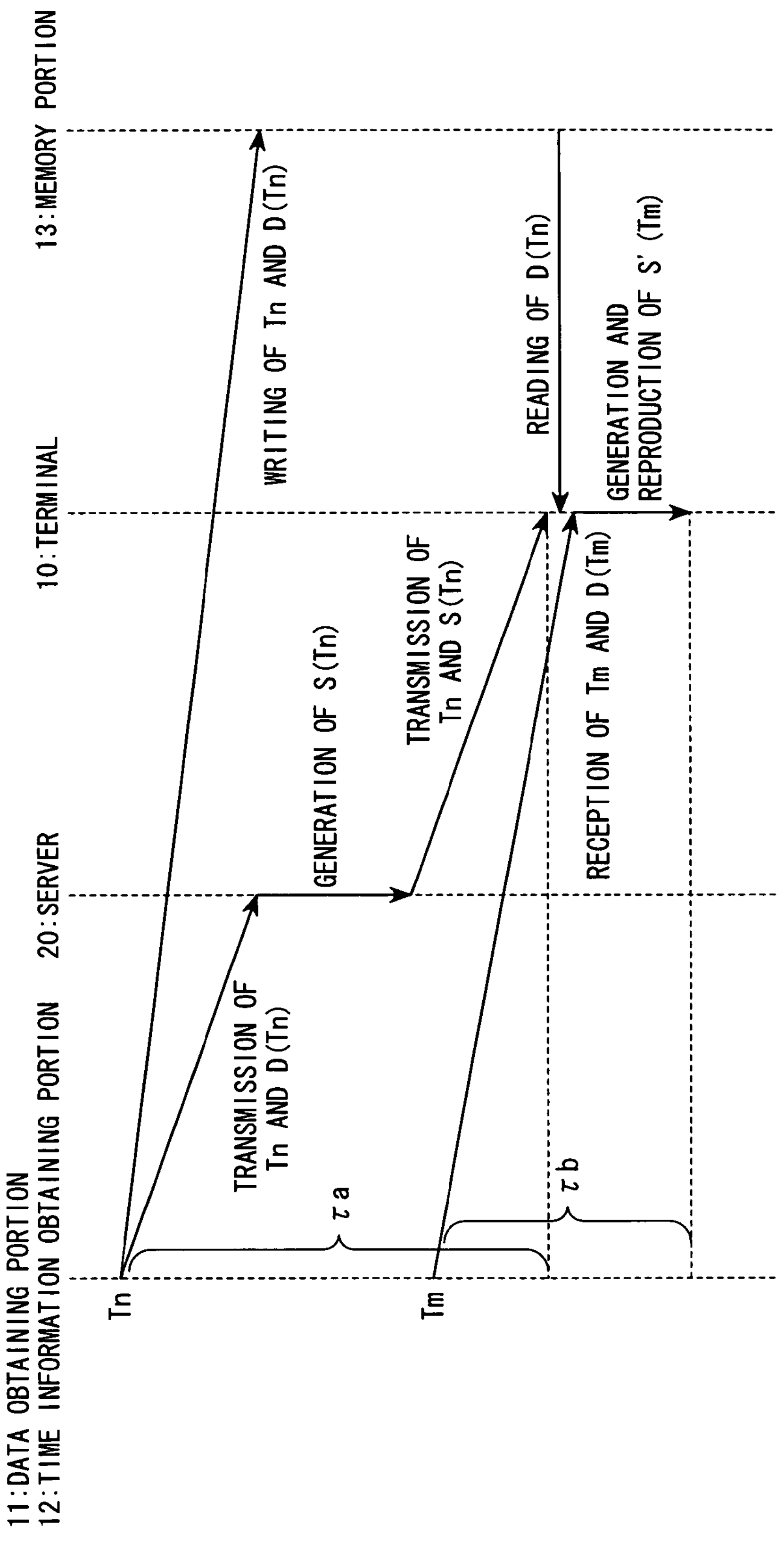
FIG. 5 is a sequence diagram for comparing a tracking delay of the first embodiment with a conventional tracking delay.
Figure 13:
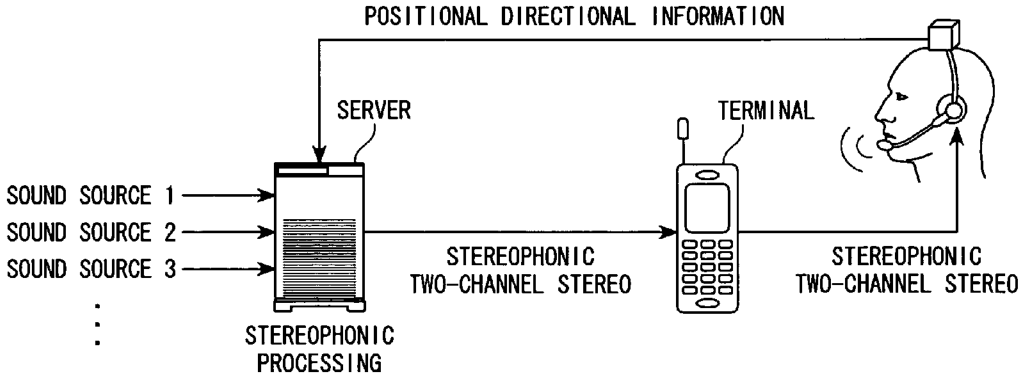
FIG. 13 is another schematic configuration of a conventional stereophonic transmitting system, showing a server-processing stereophonic transmitting system comprising a server for receiving a plurality of sound-source data and performing the stereophonic processing and transmitting them, and a terminal for reproducing received stereophonic data.
Figure 14:
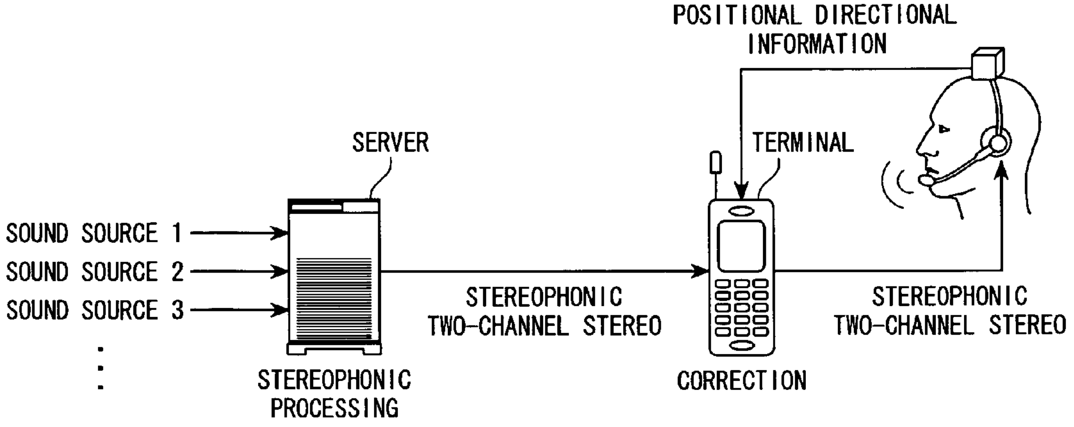
FIG. 14 is another schematic configuration of conventional stereophonic transmitting system, showing an stereophonic transmitting system comprising a server for receiving a plurality of sound-source data and performing the stereophonic processing and transmitting them, and a terminal correcting and reproducing received stereophonic data in accordance with the latest positional directional information.

FIG. 5 is a sequence diagram for explaining a tracking delay according to a conventional method and a tracking delay in an example of an operation of this embodiment described for FIG. 4. $\tau a$ shown in FIG. 5 denotes a tracking delay in the case of a reproducing method of the stereophonic data S in the conventional server processing system shown in FIG. 13 (method for once feeding back the positional directional information showing the position and direction of a listener at the time of Tn to the server-20 side, transmitting the acoustic data to which stereophonic processing is applied by the server-20 side to the terminal 10, and reproducing the acoustic data S at the time of Tn). Moreover, $\tau b$ denotes a tracking delay in the reproducing method of this embodiment shown in FIG. 4 (method for performing correction in accordance with the latest (at the time of Tm) positional directional information at the terminal-10 side and reproducing the stereophonic data S at the time of Tm). Thus, only a small tracking delay $\tau b$ is required for this embodiment compared to the tracking delay $\tau a$ of the conventional method.

In the case of this embodiment, even if the position and direction of the head of a listener are fed back from the terminal 10 to the server-20 side to reproduce a dynamic stereophonic field, it is possible to reproduce the stereophonic field at a low delay in the terminal 10 by receiving time information as auxiliary information. Moreover, because stereophonic processing corresponding to rotation of the head portion and the body is distributed by the server-20 side and the terminal-10 side, it is possible to reproduce a dynamic stereophonic field at a low delay without applying a processing load to the terminal 10 having poor resources.

Even if the relative position between a listener and a sound source and direction of the listener are changed, it is possible to improve a tracking delay or reduce processing loads.

For the above embodiment, the case that the data transmitted from the server 20 to the terminal 10 is stereophonic data is described. However, the embodiment can be also applied to image data, text data, and medium data including image data and stereophonic data.

Moreover, in the case of the above embodiment, a case is described in which single medium data of only stereophonic data is transmitted. However, when transmitting a plurality of medium data, it is allowed to use the different time information corresponding to each medium data or have one time information in common.

Second Embodiment

Next, second embodiment of the present invention is described. For the second embodiment, a data transmitter-receiver of the present invention is applied to a transmitting-side apparatus 30 and a receiving-side apparatus 40 constituting a bidirectional data transmitting system 2.

The transmitting-side apparatus 30 and receiving-side apparatus 40 respectively include a not-illustrated CPU, memory, display, and communication interface and respectively have the hardware configuration of a general computer. Software such as data and programs is stored in the memory. Among the programs, a program for transmitting and receiving time information to and from another communication apparatus together with data and performing the processing using time information is included. Functional configuration described below is realized in each apparatus 30 and 40 by the hardware and software of each apparatus 30 and 40.

Figure 6:
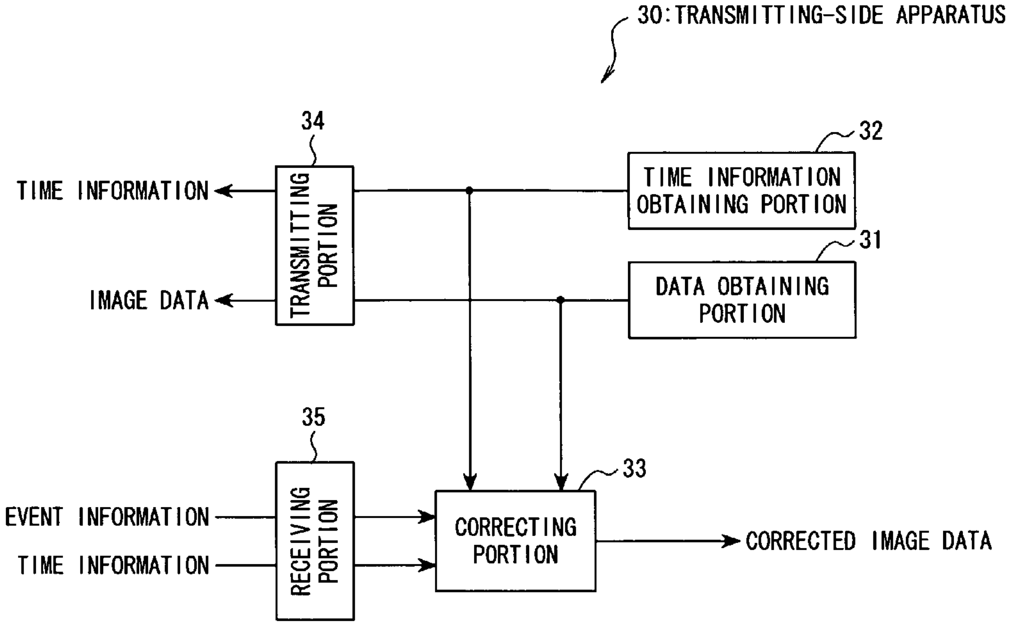
FIG. 6 is a block diagram showing a functional configuration of a transmitting-side apparatus constituting a bidirectional data transmitting system of second embodiment of the present invention.

FIG. 6 is a block diagram showing the functional configuration of the transmitting-side apparatus 30 constituting the bidirectional data transmitting system 2.

A data obtaining portion 31 obtains image data as change data to be changed depending on time.

A time information obtaining portion 32 obtains the time information showing the time when the image data obtained by the data obtaining portion 31 is generated.

A transmitting portion 34 transmits the image data obtained by the data obtaining portion 31 and time information obtained by the time information obtaining portion 32 to the receiving-side apparatus 40.

A receiving portion 35 receives event information as transmission data from the receiving-side apparatus 40. The event information is information showing that a predetermined event occurs in the receiving apparatus 40. Moreover, the receiving portion 35 receives the event information and the time information showing the time when the event occurs.

A correcting portion 33 determines what event occurs at the time shown by the time information received in accordance with the event information and time information received by the receiving portion 35 and corrects the latest image data obtained by the data obtaining portion 31 to the image data when the event occurs. Thus, this embodiment corrects the change data obtained by the data obtaining portion 31.

Figure 7:
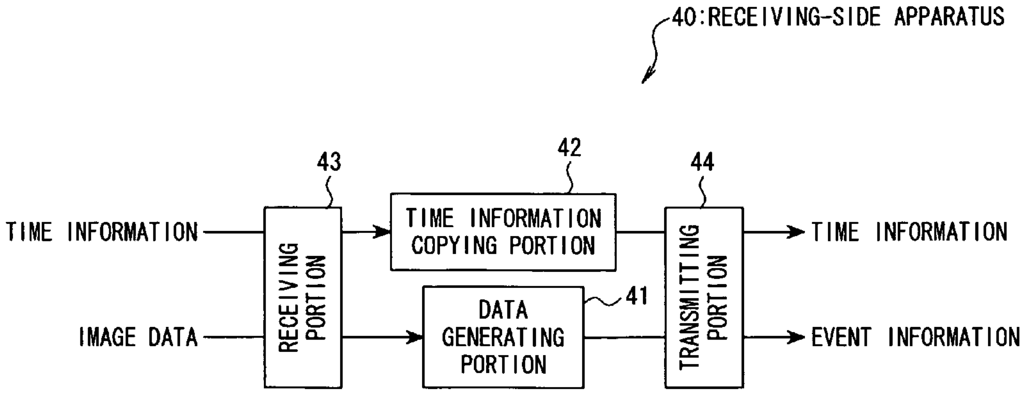
FIG. 7 is a block diagram showing a functional configuration of a receiving-side apparatus constituting the bidirectional data transmitting system of the second embodiment.

FIG. 7 is a block diagram showing a functional configuration of the receiving-side apparatus 40 constituting the bidirectional data transmitting system 2. A receiving portion 43 shown in FIG. 7 receives image data and time information showing the time when the image data is generated.

A data generating portion 41 generates event information in accordance with the image data received by the receiving portion 43. For example, when a receiver clicks image data displayed on a display received by the receiving-side apparatus 40 by a mouse in order to stop the image data, the data generating portion 41 generates the event information showing that the mouse is clicked.

A time information copying portion 42 copies the time information showing the time when the image data displayed on a display when an event occurs is generated, that is, the time information received by being related to the image data.

A transmitting portion 44 transmits the event information generated by the data generating portion 41 and the time information copied by the time information copying portion 42 to the transmitting-side apparatus 30.

<Operations>

Figure 8:
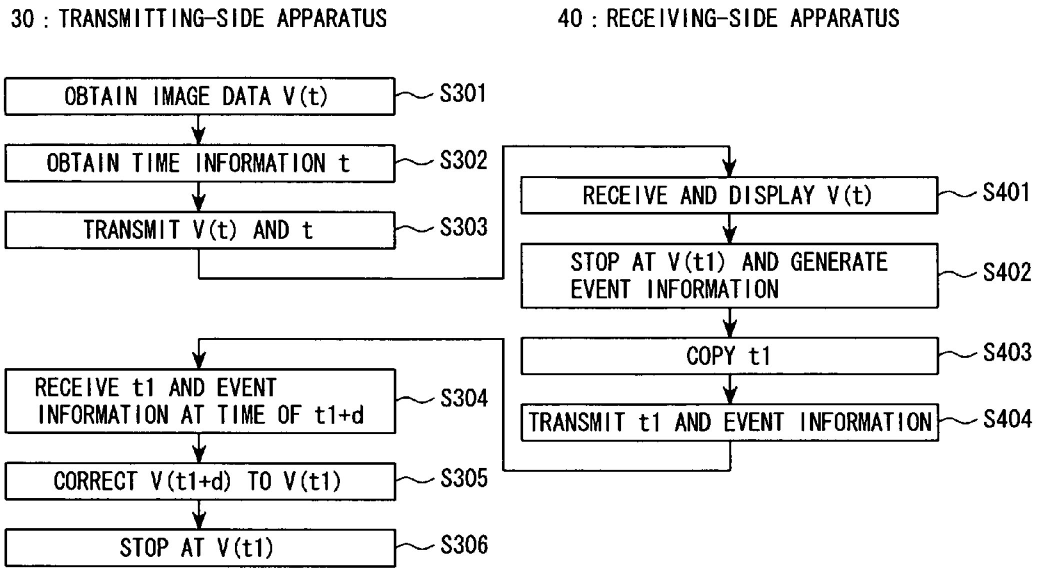
FIG. 8 is a flowchart for explaining operations of a transmitting-side apparatus and a receiving-side apparatus of the second embodiment.

Next, operations are described by referring to FIG. 8. As an operation example, an example is used in which the transmitting-side apparatus 30 transmits image data, the receiving-side apparatus 40 displays the received image data on a display, and a receiver clicks the image data by using a mouse to stop the image.

First, the data obtaining portion 31 of the transmitting-side apparatus 30 previously obtains the image data V(t) to be transmitted to the receiving-side apparatus 40 (step S301) and the time information obtaining portion 32 obtains corresponding time information t (step S302). The transmitting portion 34 transmits the image data V(t) and time information t to the receiving-side apparatus 40 (step S303).

The receiving-side apparatus 40 displays the received image data V(t) (step S401) and shows the data to a receiver. When the receiver clicks the image data V(t1) of the time information t1 for stopping the displayed image data by a mouse, the receiving-side apparatus 40 immediately stops display of the image data and the data generating portion 41 generates the event information showing that the mouse is clicked (step S402). The time information copying portion 42 copies the time information t1 corresponding to the image data in which an event occurs (step S403). The receiving-side apparatus 40 returns the event information and time information t1 to the transmitting-side apparatus 30 (step S404).

The transmitting-side apparatus 30 receives the event information and copying-time information t1 (step S304). In this case, when assuming the time required to transmit the event information and copying-time information t1 from the receiving-side apparatus 40 to the transmitting-side apparatus 30 as d, the time for the transmitting-side apparatus 30 to receive the event information and copying-time information t1 becomes t1+d. Therefore, the transmitting-side apparatus 30 completes transmission of the image data from V(t1+1) to V(t1+d) to the receiving-side apparatus 40.

The correcting portion 33 of the transmitting-side apparatus 30 determines that an event for stop occurs in the image data V(t1) at the time of the received copying-time information t1, corrects the image data V(t1+d) to the image data V(t1) (step S305), and executes the stopping processing in the image data V(t1) (step S306). Thereby, the image of the transmitting-side apparatus 30 stops at V(t1). Therefore, when the transmitting-side apparatus 30 and receiving-side apparatus 40 are stopped the images thereof become V(t1).

Thus, it is possible to correct the latest image data V(t1+d) in the transmitting-side apparatus 30 to the image data V(t1) in the time information t1 received from the receiving-side apparatus 40 and eliminate influences of a tracking delay. When performing interactive communication by using a transmission path having a delay while states of the image data obtained by the transmitting-side apparatus 30 and receiving-side apparatus 40 are momently changed, the transmitting-side apparatus 30 and receiving-side apparatus 40 can keep the same internal state by using time information.

It is considered that the transmitting-side apparatus 30 becomes the receiving side and the receiving-side apparatus 40 becomes the transmitting side depending on the conformation of bidirectional communication.

Moreover, in the case of the above embodiment, it is described that image data is transmitted from the transmitting-side apparatus 30 to the receiving-side apparatus 40. However, the type of data to be transmitted is not restricted to the image data. It is also allowed to use medium data such as stereophonic data or text data.

Moreover, the type of an event is not restricted to stop of an image. For example, it is allowed that the type of the event is an event of rapid traverse or rewinding of an image.

(Modification)

The present invention is not restricted to the above described embodiment. It is possible to variously modify the present invention as long as modifications are not deviated from the gist of the present invention. As the modifications, the following are considered.

(1) First Modification

Figure 9:
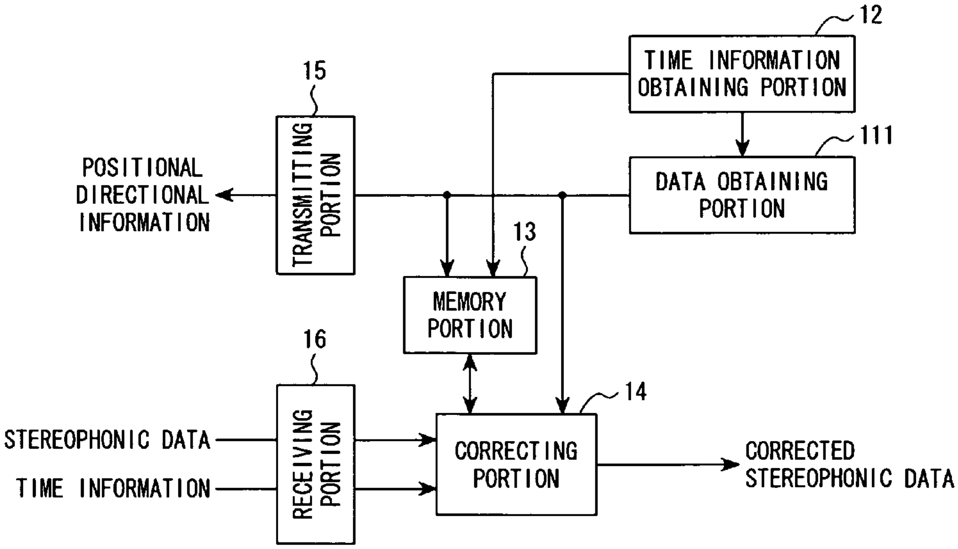
FIG. 9 is a block diagram of a functional configuration of a terminal of a first modification, an example in which a data obtaining portion operates synchronously with a time information obtaining portion.

FIG. 9 shows a functional configuration of the terminal 10 of the first modification. This modification operates when the data obtaining portion 111 synchronizes with the time information obtaining portion 12. That is, the data obtaining portion 111 obtains positional directional information synchronously with the obtaining timing of time information by the time information obtaining portion 12.

For example, a case is considered in which the terminal 10 and server 20 perform packet communication in accordance with RTP (H. Schulzrinne, et al., "RTP:A Transport Protocol for Real-Time Applications", RFC1889, Jan. 1996). In this case, the time information obtaining portion 12 of the terminal 10 includes, for example a timer for clocking the transmission timing of a RTP packet and the time information obtaining portion 12 obtains time information in accordance with the RTP-packet transmission timing clocked by the timer. The time information obtaining portion 12 stores the obtained time information in the memory portion 13 and communicates the timing for obtaining positional directional information to the data obtaining portion 111. The data obtaining portion 111 obtains positional directional information in accordance with the timing communicated from the time information obtaining portion 12. The terminal 10 generates a RTP packet including positional directional information and adds a time stamp when the RTP packet is generated to a RTP header as ever.

Thereby, it is possible to use the time stamp in the RTP header as time information and reduce the auxiliary information to be transmitted to the server 20.

As another modification, it is allowed that the time information obtaining portion 12 does not include a timer for clocking the transmission timing of the RTP packet but it receives the notice for the transmission timing of the RTP packet from an external timer and obtains time information in accordance with the timing.

Moreover, this modification can be similarly applied to the transmitting-side apparatus 30 of the second embodiment.

(2) Second Modification

Figure 10:
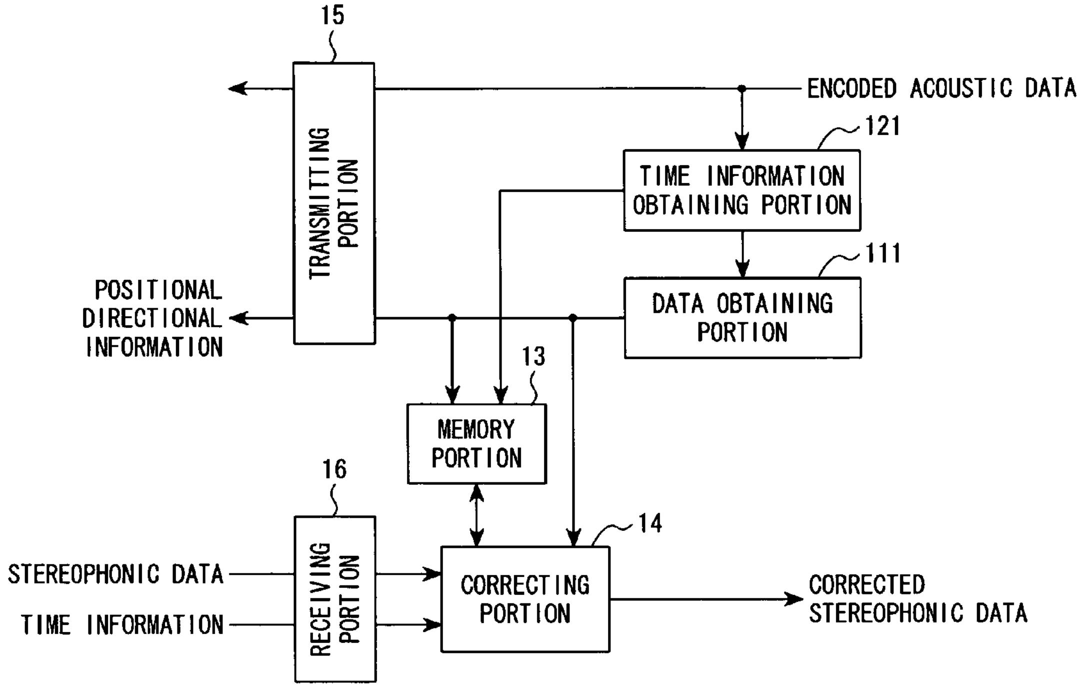
FIG. 10 is a block diagram of a functional configuration of a terminal of the second modification, showing an example in which a time information obtaining portion operates synchronously with the encoding period of listener-side encoded acoustic data.

FIG. 10 shows a functional configuration of the terminal 10 of the second modification. In the case of this modification, the time information obtaining portion 121 operates synchronously with the encoding period of the listener-side encoded acoustic data and thereby obtains time information. Moreover, in the case of this modification, the data obtaining portion 111 operates synchronously with a time information obtaining portion 121 similarly to the case of the first modification and thereby obtains positional directional information.

When the terminal 10 encodes the listener-side acoustic data such as voice of a listener and transmits the data to the sever 20, the time information obtaining portion 121 uses time information of acoustic data such as an encoded frame period or sampling period as time information to be obtained. Because the data obtaining portion 111 operates synchronously with the data obtaining portion 12, the data obtaining portion 111 resultantly obtains positional directional information in accordance with the encoding period of the listener-side acoustic data.

Specifically, the time information obtaining portion 12 only has to count, for example, the number of encoded frames of encoded acoustic data and store the frame numbers in the memory portion 13 together with positional directional information as time information. When assuming communication start time as TO, it is possible to calculate the time Tn when generating positional directional information from an encoding frame length L and number N as $Tn=TO+L\times N$.

It is also allowed to generate the positional directional information every frame or when using a short period such as a sampling period, it is allowed to generate the positional directional information every several samples.

The above-described calculation expression is effective even when the time information received from the sever-20 side is the frame number N or time Tn. Therefore, it is possible to read corresponding positional directional information from the memory portion 13.

The server 20 receiving the encoded acoustic data can calculate time from the encoded acoustic data by the same procedure as the case of the terminal 10. Moreover, because the terminal 10 can calculate time from a frame number even if the terminal 10 receives the frame number from the server 20, the terminal 10 does not have to transmit time information to the server 20 and can reduce auxiliary information to be transmitted to the server 20.

The encoded acoustic data is not restricted to acoustic data. Any data can be used as long as the data is encoded data. For example, it is allowed to use encoded positional directional information. Moreover, this modification can be similarly applied to the transmitting-side apparatus 30 of the second embodiment.

(3) Third Modification

Figure 11:
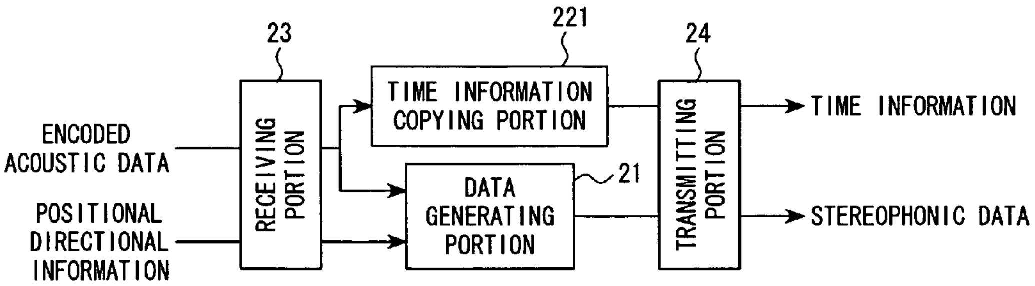
FIG. 11 is a block diagram of a functional configuration of a server of third modification, showing an example in which time information is copied from received acoustic-encoding acoustic data to transmit the information together with stereophonic data.
Figure 12:
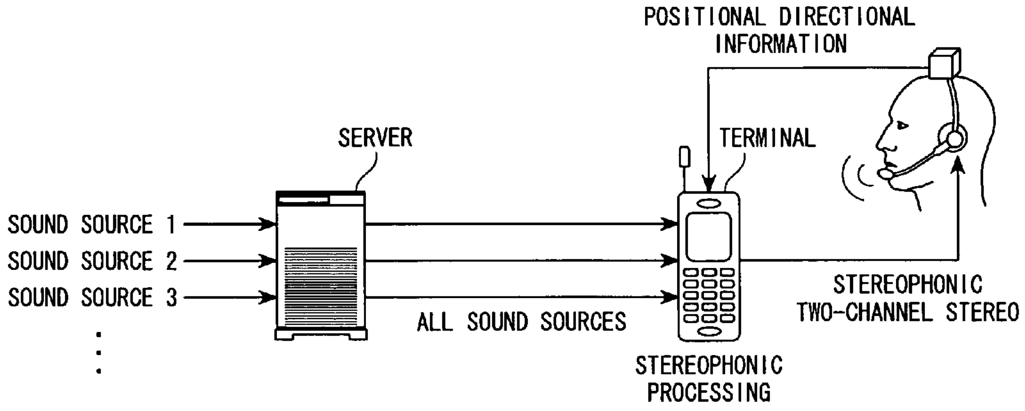
FIG. 12 is a schematic configuration of a conventional stereophonic transmitting system, showing a terminal for performing stereophonic processing receiving a plurality of sound-source data.

FIG. 11 shows a functional configuration of the server 20 of the third modification. In the case of this modification, the server 20 receives encoded acoustic data instead of time information and calculates and generates time information from the received encoded acoustic data.

The receiving portion 23 of the server 20 receives encoded acoustic data and positional directional information from one or more terminals 10.

The data generating portion 21 applies stereophonic processing to the received encoded acoustic data or other acoustic data to be transmitted to the terminal 10 in accordance with the positional directional information obtained by the receiving portion 23 to generate stereophonic data to be reproduced at the terminal-10 side. In this case, if necessary, the portion 21 performs decoding before the stereophonic processing.

In this case, in order to perform correction in accordance with the latest positional directional information at the terminal-10 side, the time information showing what point of time of a sound field the stereophonic data belongs to is required. In the case of this modification, when receiving encoded acoustic data from the terminal 10 shown in FIG. 10, a time information copying portion 221 can generate time information by using the received encoded acoustic data even if the receiving portion 23 of the server 20 does not receive time information. For example, it is allowed to count the number of encoded frames of the encoded acoustic data received by the time information copying portion 221 and use the frame numbers as time information. Moreover, it is allowed that the time information copying portion 221 calculates the time Tn when generating positional directional information by using the above-described calculation expression from the encoding frame length L and frame number N by setting the communication start time to TO.

Thus, it is possible to generate time information from the received encoded acoustic data. Therefore, when the terminal 10 shown in FIG. 10 generates positional directional information in accordance with the encoding period of encoded acoustic data and transmits the information to the server 20, the server 20 can transmit the time information showing what point of time of a sound field stereophonic data belongs to the terminal-10 side even if the server 20 does not receive time information. Because it is unnecessary to transmit time information to the server 20, it is possible to reduce auxiliary information and restrain the data transmission bandwidth.

The encoded acoustic data is not restricted to acoustic data as long as it is encoded data. Moreover, this modification can be similarly applied to the receiving-side apparatus 40 of the second embodiment.

When performing interactive communication through a transmission path having a delay in an communication environment such as a mobile communication network in which various states such as position and direction of a listener, position of another communication apparatus, and internal states of a transmitting-side apparatus and receiving-side apparatus are dynamically changed, it is possible to apply the present invention to every industry which must reduce influences of a transmission delay and improve the quality of communication.

What is claimed is:

1. A data transmitter-receiver for performing bidirectional data transmission with another communication apparatus, the data transmitter-receiver comprising:

data obtaining means for obtaining change data which is changed depending on time;

time information obtaining means for obtaining time information showing a time when the change data obtained from the data obtaining means is generated;

receiving means for receiving transmission data and predetermined time information showing that the transmission data is generated at a predetermined time, the transmission data and the predetermined time information being transmitted from the another communication apparatus;

correcting means for correcting a delay introduced by data transmission with the another communication apparatus in accordance with the change data obtained by the data obtaining means, the time information obtained by the time information obtaining means, the predetermined time information and the transmission data received by the receiving means;

transmitting means for transmitting to the another communication apparatus the change data generated at the predetermined time obtained by the data obtaining means and the predetermined time information showing the predetermined time received by the receiving means; and storing means for relating the change data obtained by the data obtaining means with the time information showing the time obtained by the time information obtaining means and storing the data and the information;

wherein the correcting means corrects the transmission data at the predetermined time information received by the receiving means to transmission data corresponding to the latest time information in accordance with the difference between the latest change data corresponding to the latest time information and the change data corresponding to the predetermined time information, which are stored in the storing means.

2. The data transmitter-receiver according to claim 1, wherein the correcting means corrects a tracking delay of the transmission data at the predetermined time received by the receiving means in accordance with the difference between the change data at the predetermined time transmitted by the transmitting means and the latest change data obtained by the data obtaining means.

3. The data transmitter-receiver according to claim 1, wherein the data obtaining means obtains change data synchronously with the obtaining timing of the time information by the time information obtaining means.

4. The data transmitter-receiver according to claim 3, wherein the time information obtaining means obtains time information synchronously with the encoding period of encoded data to be transmitted to the another communication apparatus.

5. The data transmitter-receiver according to claim 1, wherein the transmission data is medium data and the change data is positional directional information showing at least one of the position and direction of a receiver for receiving the medium data.

6. The data transmitter-receiver according to claim 1, wherein the data obtaining means obtains the change data from any one of a sensor, Global Positioning System (GPS), compass, and joystick.

7. The data transmitter-receiver according to claim 1, wherein the transmission data is any one of stereophonic data, image data, text data, and medium data including the image data and the stereophonic data.

8. A data transmitting and receiving method for performing bidirectional data transmission with another communication apparatus, comprising:

obtaining change data which is changed depending on time;

obtaining time information showing a time when the change data obtained is generated;

receiving transmission data and predetermined time information showing that the transmission data is generated at a predetermined time, the transmission data and the predetermined time information being transmitted from the another communication apparatus;

correcting a delay introduced by data transmission with the another communication apparatus in accordance with the change data obtained, the time information obtained, the predetermined time information received, and the transmission data received;

transmitting to the another communication apparatus the change data generated at the predetermined time obtained and the predetermined time information showing the predetermined time received; and relating the change data obtained with the time information showing the time obtained and storing the data and the information;

wherein in the correcting the transmission data is corrected at the predetermined time information received to transmission data corresponding to the latest time information in accordance with the difference between the latest change data corresponding to the latest time information and the change data corresponding to the predetermined time information, which are stored in the storing.

* * * * *